Aug. 9, 1966    B. V. SCHULTZ ETAL    3,264,936
OVERHEAD PROJECTION STAGE FOR TRANSPARENCIES
Filed June 17, 1964    2 Sheets-Sheet 2
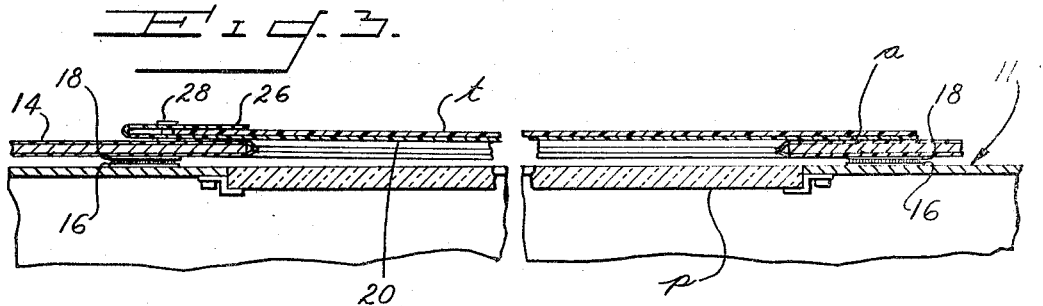
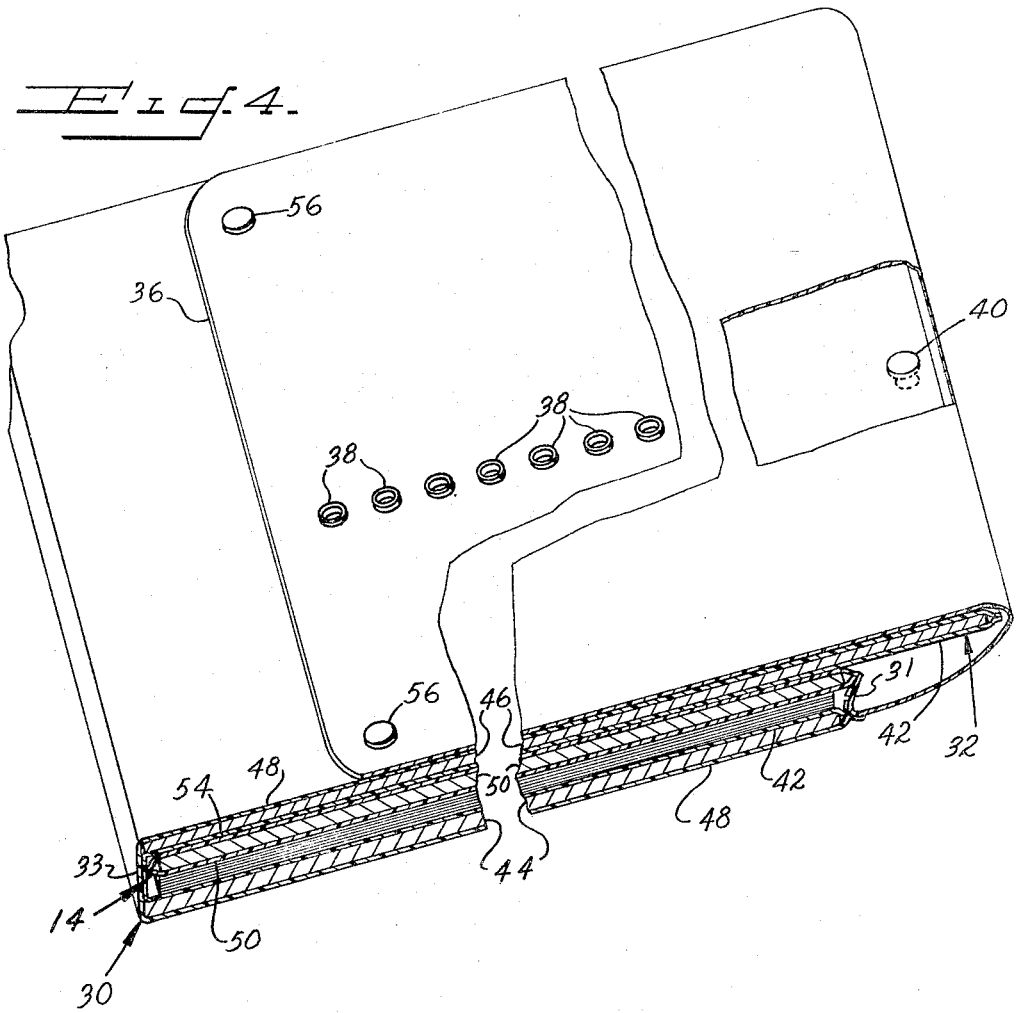
INVENTOR
BENNETT V. SCHULTZ
ROBERT F. BELIVEAU
EARL S. STAHL
BY Chapin & Neal
ATTORNEYS United States Patent Office 3,264,936
Patented August 9, 1966

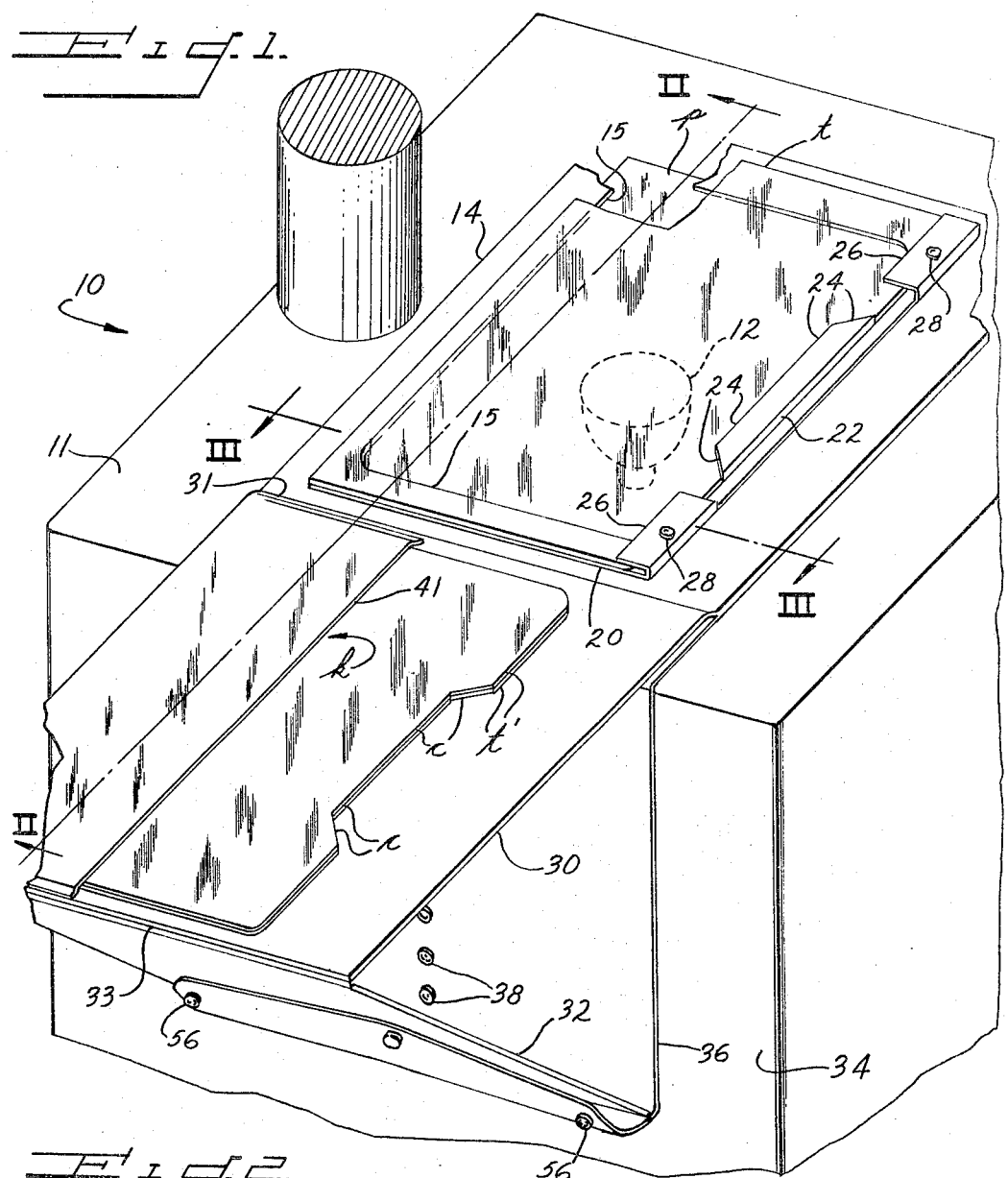

3,264,936
OVERHEAD PROJECTION STAGE FOR TRANSPARENCIES
Bennett V. Schultz, Holyoke, Robert F. Beliveau, Easthampton, and Earl S. Stahl, Springfield, Mass., assignors to Tecnifax Corporation, Holyoke, Mass., a corporation of Massachusetts
Filed June 17, 1964, Ser. No. 375,823
8 Claims. (Cl. 88—24)

This invention relates to means for projecting image bearing transparencies from an overhead projector onto a screen.

In recent years the overhead projector has come into widespread use in all types of visual communications, particularly in education. In visual communication it is usually beneficial to project successively portions of a final composite image. In this way a new concept can be developed for the audience in a series of logical steps. The first projection may be an outline or an overall portion of the final composite image. The other image bearing films, known as overlays, may then be superposed over the first film.

It is the usual practice to attach to a mount or slide frame the primary image bearing transparency while the overlays are hinged to the slide frame so that they can be swung into and out of projecting position over the stationary transparency, sometimes referred to as a "static." For each concept there is usually one slide mount with static transparency and a number of overlays hinged to one or more edges of the mount. It will thus be appreciated that for any given course of study, there will be a large number of frame-mounted slide transparencies, each having a plurality of hinged overlays. One of the principal drawbacks of this conventional arrangement is that the desired order of showing overlays frequently changes and should not be restricted to the order in which they are mounted because frequently, during a course of instruction, the lecturer will wish to change the order of presentation. The decision to do this may be on the spur of the moment during the presentation as a result of audience reaction or the lack of it.

The principal object of this invention is to provide improved means for projecting transparencies on an overhead projector.

It is another object of this invention to provide means for projecting image bearing transparencies which is more versatile than projection appurtenances heretofore available.

Another object of the invention is to provide a projection accessory or appurtenance for quick, easy and accurate registration of transparencies with each other and for proper positioning of the transparencies with the field of projection of an overhead projector.

A further object of the invention is to provide means for storage and projection of a series of transparencies which can be readily attached to an overhead projection whereby is provided a projection stage, with registration means and a work support shelf adjacent the projection stage.

The ends are attained by the provision of a projector accessory or kit comprising an aperture or frame panel which may be removably secured to the horizontal stage of an overhead projector in registered relation to a light source projecting upwardly therefrom. Preferably, means are provided on the aperture or frame panel for registering the transparencies relative thereto as well as to each other. A shelf panel is hingedly connected to the aperture panel and forms an extension of the projector stage. The transparencies to be projected are supported on the shelf so that individual transparencies are readily available for projection. The accessory also includes means for retaining the shelf panel in a horizontal position as an extension of the projector stage. These means and the shelf and aperture panels may be folded and secured in superposed relation with the group of transparencies constrained therebetween, preferably in a pocket formed on the shelf panel, to form a compact device for carrying or storing the transparencies.

The above and other related objects and features of the invention will be apparent from a reading of the following description of the disclosure found in the accompanying drawings and the novelty thereof pointed out in the appended claims.

In the drawings:
FIGURE 1 is a perspective view with portions broken away of an overhead projector illustrating an embodiment of the invention as it is used to display transparencies;
FIG. 2 is a section on an enlarged scale and with portions broken away, taken on line II—II in FIG. 1;
FIG. 3 is a similar section taken on line III—III in FIG. 1; and
FIG. 4 is a perspective view illustrating the kit folded for the storage of the transparencies.

The overhead projector 10 seen in FIG. 1 comprises a horizontal stage 11 having a light source 12 (schematically illustrated) therebeneath which is projected upwardly through a transparency $t$ which overlies a frosted plate $p$. The beam of light is then reflected by a focusing head, not shown, onto a screen on which is thus projected the image on the transparency $t$.

The transparency $t$ is disposed on an aperture or frame panel 14 which is releasably secured to the stage 11 with its aperture or opening 15 registered above the light source 12. The aperture panel 14 is releasably secured to the stage 11 by cooperating means comprising strips 16 (FIG. 3) secured to the stage 11 and strips 18 secured to the undersurface of the aperture panel 14. The strips 16 and 18 comprise a large number of fine wires which are so shaped that when meshed, as seen in FIG. 3, they provide a firm but releasable securing means. These strips sometimes referred to as hook'n loop fasteners are available under the trademark Velcron. Alternatively, snaps or hooks could be used as the releasable securing means attaching the aperture panel to the stage.

It is preferable to provide a relatively stiff transparent plastic panel 20 overlying the opening 15 to insure that the transparencies will be flat as they are viewed. Since scratches or the like on the panel 20 will also be projected onto the viewing screen, panel 20 is removably secured to the aperture panel 14 by any suitable means, such as a band of pressure sensitive adhesive $a$ (FIG. 3) along one marginal edge portion thereof. Velcron strips on the panel 14 and transparent panel 20 can also be used in lieu of the adhesive band $a$.

It is also preferable to provide on the aperture panel 14 means for registering transparencies relative to the opening 15 as well as to each other. A wide variety of means could be employed for this purpose. For example, in the present instance these means comprise a strip 22 secured to the panel 20. The vertical outline of this strip is an inwardly pointing truncated triangle providing positioning edges 24 which are engaged by corresponding cut edges $c$ on the transparencies (see transparencies $t'$ to the left of the aperture panel). The strip 22 has a thickness several times that of the transparencies so that a set of transparencies may be overlaid in registered relation to form a composite image as previously discussed. The cut edges $c$, of course, are in registered relation to the images on the transparencies $t$. Inwardly extending flaps 26 overlie, in spaced relation, the panel 20 on both ends of the strip 22 to facilitate engagement of the cut edges $c$ with the positioning edges 24. Eyelets 28 may be provided to limit flexure of the flaps 26 and may also serve as registration means in combination with or even in lieu of the wedge shaped strip 22. Where the eyelets 28 are used as the sole registration means, the film would be cut or notched to register and interfit against the eyelets which thus serve in the nature of a pair of registration posts.

A shelf panel 30 is hingedly connected at 31 to the frame panel 14 and extends beyond the side edge of the stage 11 to provide a work support shelf or table for the lecturer. The shelf panel is maintained in a horizontal position by a support panel 32 hingedly connected to its outer end at 33 and angled inwardly to engage the adjacent side 34 of the projector 10. A flexible flap 36 extends from between the panels 14 and 30 at approximately hinge line 31. The lower end of the flap 36 is provided with a series of snaps 38 which may be selectively engaged with a fastener 40 (see FIG. 4) on the panel 32 to maintain the latter at the proper angle for the desired positioning of the shelf panel 30. In lieu of the snaps, strips or pads of Velcron may be appropriately placed on the flap 36 and panel 32. This provides means for accommodating variations in the lateral distance between the light source and side wall of different styles of projectors as well as enabling the shelf panel to be tilted from a horizontal panel, if desired. Horizontal disposition of the shelf panel 30 is preferred, however.

The shelf panel is provided with a pocket $k$ formed by a sheet of material 41 secured thereto along three edges. Other transparencies $t'$ are stored in this pocket and may be readily drawn therefrom to be placed on the aperture panel 14, being registered on panel 20 by strip 22. After viewing, the transparencies may then be returned to shelf panel 30 so there is little likelihood of their being misplaced or damaged.

When view of the transparencies is completed, the entire group may be inserted in the pocket $k$. The aperture panel 14 may be released from the stage 11 and folded over the shelf panel 30 (FIG. 4). The snap fastener 38, 40 will be released and the support panel 32 will be folded over the aperture panel 14. Flap 36 will then be folded over the free end of support panel 32 and secured to the outer surface thereof by snap fasteners 56 thus holding the panel members in superposed relation. The transparencies are thus well protected in a compact case for storage or to be carried about as needed.

The kit is advantageously fabricated by forming the panels 14, 30 and 32 as a composite of flexible heat sealable sheet material covering inserts of fiberboard or the like. Thus, one sheet 42 (FIG. 2) of flexible plastic material (a vinyl plastic is satisfactory) covers the fiberboard inserts 44, 46 and a second sheet 48 of similar material covers the opposite surface of these inserts. The marginal edge portions of sheets 42, 48 are secured together by heat sealing and are also heat sealed along a line between these inserts to provide the hinge connection 33. The aperture panel 14 is also compositely formed by an insert 50 and plastic sheets 52, 54 which are heat sealed along their outer marginal edge portions, as well as along their inner marginal edge portions defining the opening 15. The adjacent sealed portions of the plastic sheets 42, 48 and 52, 54 are secured by heat sealing to form the hinge connection 31. The sheet 54 is extended beyond the hinge connection 31 to form the flap panel 36.

The illustrated embodiment will suggest modifications to those skilled in the art which will be within the spirit and scope of the present invention as it is to be derived solely from the following claims.

Having thus described the invention, what is claimed is:

1. A kit for facilitating display of a group of transparencies in combination with an overhead projector having a horizontal stage with a light source, said kit comprising an aperture panel, cooperating means on said panel and said stage for detachably securing said aperture panel in registered relationship above said light source, a relatively stiff sheet of transparent material secured to said aperture panel and overlying said aperture to provide a flat surface for receiving transparencies as they are displayed by the projector, means on said panel for registering said transparencies, with respect to each other as well as with respect to said aperture, a shelf panel hingedly connected to the aperture panel at one lateral side of said stage and extending therebeyond, said shelf panel having a storage pocket opening on the upper surface thereof for receiving the group of transparencies and positioning them for ready access and transfer to and from the aperture panel, a shelf support panel hingedly connected to the outer end of the shelf panel and angled downwardly and inwardly therefrom towards the adjacent side of the projector, a flexible flap panel secured at one adjacent the hinge connection between the shelf and aperture panels and releasably secured to the lower end of said support panel to maintain the support panel in a position wherein the shelf panel is supported in a generally horizontal plane, said aperture panel upon detachment from said stage being foldable into superposed relation with said shelf panel, and said support panel upon detachment of the flap panel therefrom being foldable to superposed relation with said aperture panel with the group of transparencies confined in said pocket, and means for securing said flap panel to said support panel to provide a compact carrier for protecting the transparencies as they are stored or carried about.

2. A storage kit for facilitating display of a group of transparencies on an overhead projector having a horizontal stage, said kit comprising an aperture panel adapted to be secured to said stage, a relatively stiff sheet of transparent material secured to said aperture panel and overlying said aperture to provide a flat surface for receiving transparencies as they are displayed by the projector, means on said panel for registering said transparencies with respect to each other as well as with respect to said aperture, a shelf panel hingedly connected to the aperture panel and adapted to extend beyond one lateral side of said stage, said shelf panel having a storage pocket opening on the upper surface thereof for receiving the group of transparencies and positioning them for ready access and transfer to and from the aperture panel, a shelf support panel hingedly connected to the opposite end of said shelf panel and adapted to be angled downwardly and inwardly towards an adjacent side of the projector, a flexible flap panel secured at one end adjacent the hinge connection between the shelf and aperture panels and means for releasably and selectively securing the opposite end of said flap panel to the lower end of said support panel at a point maintaining the support panel in a position wherein the shelf panel is supported in a generally horizontal plane, said aperture panel being foldable into superposed relation with said shelf panel with a group of transparencies confined in said pocket, said support panel being foldable into superposed relation with said aperture panel and means for securing said flap panel to said support panel to retain the panels in superposed relation and provide a compact carrier for protecting the transparencies as they are stored or carried about.

3. A kit as in claim 2 wherein the relatively stiff transparent panel is removably secured to said aperture panel to enable its replacement in case of damage, and further wherein the transparency registering means are provided on said transparent sheet.

4. A kit as in claim 2 wherein the aperture shelf and support panels are compositely formed by relatively rigid inserts covered on opposite sides by a flexible plastic material, the hinge connections are formed by heat sealed seams of said plastic material and the flexible flap panel is joined by heat sealing to the seam providing the hinge connection between the shelf panel and aperture panel.

5. An accessory for displaying transparencies on an overhead projector having a horizontal stage with a light source, said accessory comprising a frame panel, means for detachably securing said frame panel on the stage of said overhead projector, a shelf panel hingedly connected to said frame panel and swingable in superposed and coplanar relation, and means for releasably retaining said shelf panel in generally coplanar relation adjacent said frame panel when the latter is mounted on the stage of the overhead projector, said retaining means including a flexible flap for at least partially enclosing said accessory.

6. An accessory for displaying transparencies on an overhead projector having a horizontal stage with a light source, said accessory comprising a frame panel, means for detachably securing said panel on the stage in registered relation with said light source, a shelf panel hingedly connected to said frame panel and extending beyond one lateral side of said stage and means for supporting the outer end of said shelf panel, said supporting means including a shelf support panel hingedly connected to said shelf panel and a flexible flap panel secured at one end adjacent the hinge connection between the shelf and frame panels and engageable with said support panel for supporting the outer end of said shelf panel, said panels being foldable into superposed relation and said flexible flap at least patrially enclosing said panels when folded into said superposed relation.

7. A storage kit for facilitating display of a group of transparencies by an overhead projector having a horizontal stage, said kit comprising an aperture panel adapted to be secured to said stage, a shelf panel hingedly connected to said aperture panel and adapted to extend beyond one lateral side of said stage, means for supporting the outer end of said shelf panel in such extended position, said hinge connection between said aperture panel and said shelf panel and a support panel engageable with said flexible flap and said shelf panel, said shelf panel having a storage pocket in its upper surface to facilitate transfer of transparencies to and from the aperture panel, said panels being foldable into superposed relation with the group of transparencies confined in said pocket, and said flexible flap at least partially enclosing said panels when folded into said superposed relation.

8. Accessory for displaying transparencies on an overhead projector comprising a frame panel, means for releasably attaching said panel on the stage of an overhead projector, means for registering transparencies in superposed relation over said frame panel, a shelf panel hingedly connected to said frame panel and swingable in superposed and coplanar relation, and means for releasably retaining said shelf panel in generally coplanar relation adjacent said frame panel when the latter is mounted on the stage of the overhead projector, said retaining means including a flexible flap for at least partially enclosing said accessory when removed from the stage of the overhead projector.

References Cited by the Examiner
UNITED STATES PATENTS

| | | | |
|---|---|---|---|
| 2,718,171 | 9/1955 | Fitzgerald | 88—26 X |
| 3,059,529 | 10/1962 | Lucas | 88—24 |
| 3,084,594 | 4/1963 | Ray | 88—26 |

NORTON ANSHER, *Primary Examiner.*

V. A. SMITH, *Assistant Examiner.*